(12) United States Patent
Spencer et al.

(10) Patent No.: US 8,859,666 B2
(45) Date of Patent: Oct. 14, 2014

(54) VARIABLE VISCOSITY SOLVENTLESS PREPOLYMER FORMULATION

(75) Inventors: Brian E. Spencer, Sacramento, CA (US); Zachary B. Spencer, Sacramento, CA (US)

(73) Assignee: Spencer Composites Corporation, Sacramento, CA (US)

( * ) Notice: Subject to any disclaimer, the term of this patent is extended or adjusted under 35 U.S.C. 154(b) by 173 days.

(21) Appl. No.: 13/311,290

(22) Filed: Dec. 5, 2011

(65) Prior Publication Data

US 2013/0144022 A1 Jun. 6, 2013

(51) Int. Cl.
*C08K 3/40* (2006.01)
*C08F 36/00* (2006.01)

(52) U.S. Cl.
USPC .......................................... 524/494; 526/283

(58) Field of Classification Search
USPC ....................................................... 524/494
See application file for complete search history.

(56) References Cited

U.S. PATENT DOCUMENTS

| 4,906,797 | A | * | 3/1990 | Lane et al. ........................ 585/1 |
| 4,981,931 | A | | 1/1991 | Bell |
| 5,098,750 | A | | 3/1992 | Ueno et al. |
| 6,310,121 | B1 | | 10/2001 | Woodson et al. |
| 2010/0201472 | A1 | * | 8/2010 | Le et al. .......................... 336/96 |

FOREIGN PATENT DOCUMENTS

JP 2004-331798 11/2004

OTHER PUBLICATIONS

International Search Report and Written Opinion for PCT/US2012/067613, mailed Mar. 15, 2013, 5 pgs.

* cited by examiner

*Primary Examiner* — Hui Chin
(74) *Attorney, Agent, or Firm* — Squire Patton Boggs (US) LLP

(57) ABSTRACT

This invention relates to a prepolymer formulation comprising dicyclopentadiene that is at least 92% pure wherein the prepolymer formulation is flowable at ambient temperatures by virtue of the addition of a reactive ethylene monomer to the formulation.

12 Claims, No Drawings

VARIABLE VISCOSITY SOLVENTLESS PREPOLYMER FORMULATION

FIELD

This invention relates to a solventless prepolymer formulation comprising dicyclopentadiene that is at least 92% pure in which the viscosity of the formulation may be manipulated for use under various operating conditions.

BACKGROUND

Thermoset polymers have distinct advantages over thermoplastic polymers in may situations. For example, thermoplastics are not readily amenable to filling with glass or carbon fibers to produce composites. They also tend to have poor chemical and heat resistance and poor thermal stability. Thermoplastic polymers also tend to creep, which can be extremely undesirable in uses where very high tolerance is required. Thermoset polymers on the other hand tend to exhibit superior characteristics in all the foregoing as well as other physical and chemical properties.

A relatively new family of thermoset polymers is that comprising dicyclopentadiene monomer (DCPD). The homopolymer of DCPD is polydicyclopentadiene (pDCPD). While still a relatively new polymer, the physical and chemical properties of which have not as yet been fully explored, it is already exhibiting impressive properties with regard to, for instance, very high impact resistance, excellent chemical corrosion resistance and a high heat deflection temperature.

Due to its outstanding properties, pDCPD already has many uses, for example as vehicle parts, dish antennas and storage tanks for hazardous chemicals. While many fabrication techniques may be employed with pDCPD, reaction injection molding (RIM) is the technique most frequently used. In this method, DCPD and a curing catalysts are injected into a mold and left there until polymerization is complete.

PDCP used in RIM is generally of relatively low purity, in the mid 80% range for the most part. It has been found, however, that constructs formed of high purity DCPD—92% or higher—tend to display superior properties to constructs made of lower purity DCPD. The problem is that the higher purity DCPD tends to be very viscous, at least at temperatures below 100° F., and therefore must generally be heated in order to render the prepolymer formulation flowable for use in RIM processing. Not only does the necessity for heating the high purity DCPD detract from the economical aspects that makes its use desirable, it also presents a problem with regard to curing in that such may occur too rapidly resulting in partially formed constructs or constructs containing structural flaws. Thus, while the properties of pDCPD formed from high purity DCPD are most desirable, to date nothing has been done to ameliorate the foregoing and make use of the high purity DCPD more feasible.

What is needed, then, is a prepolymer formulation comprising high purity dicyclopentadiene that is amendable to use in a wide variety of construct fabrication processes, in particular economical processes such as RIM that may be used at ambient temperature (and lower) fabrication and cure conditions. The present invention provides such a formulation.

SUMMARY

Thus, an aspect of this invention is a method of fabricating a polymeric construct, comprising:

providing a template in the desired shape of the polymeric construct;

depositing into or onto the template a prepolymer composition comprising dicyclopentadiene that is at least 92% pure, a reactive ethylene monomer and a curing catalyst, wherein:

the reactive ethylene monomer comprises a weight percentage of the total monomer content such that the prepolymer composition has a desired viscosity at a preselected deposition temperature; and curing the deposited prepolymer composition to form the polymeric construct.

In an aspect of this invention, the template comprises a mold.

In an aspect of this invention, the template comprises a die.

In an aspect of this invention, the template comprises a mandrel.

In an aspect of this invention, the template comprises a fully-formed construct comprising the prepolymer formulation or an entirely different material and the method of claim 1 is used to apply a layer comprising the prepolymer formulation onto the construct.

In an aspect of this invention, the reactive ethylene monomer comprises from about 1 wt % to about 10 wt % of the total monomer content.

In an aspect of this invention, the reactive ethylene monomer comprises from about 4 wt % to about 6 wt % of the total monomer content.

In an aspect of this invention, the reactive ethylene monomer comprises unsubstituted or substituted norbornene.

In an aspect of this invention, the substituted norbornene is a 5-alkyl norbornene.

In an aspect of this invention, the 5-alkyl moiety is selected from the group consisting of 1C-12C straight or branched chain alkyls.

In an aspect of this invention, the straight chain alkyl is selected from hexyl or decyl.

In an aspect of this invention, the curing catalyst is selected from the group consisting of ROMP catalysts.

In an aspect of this invention, wherein the polymeric construct comprises a polymeric composite.

In an aspect of this invention, the polymeric composite comprises a particulate, fibrous, filamentous or any combination of the foregoing, reinforcing material.

In an aspect of this invention, the particulate reinforcing material comprises nanoparticles.

In an aspect of this invention, the fibrous or filamentous reinforcing material is selected from the group consisting of glass, carbon, aramid and ultra high molecular weight polyethylene.

In an aspect of this invention, the reinforcing material comprises 10 vol % to 90 vol % of the prepolymer composition.

An aspect of this invention is a construct fabricated using the method of claim 1.

An aspect of this invention is a prepolymer formulation, comprising:

polydicyclopentadiene; and a reactive ethylene monomer, wherein:

the quantity of reactive ethylene monomer in the prepolymer composition is calculated to provide the prepolymer composition with a selected viscosity at a selected operating temperature.

DETAILED DESCRIPTION

Discussion

It is understood that, with regard to this description and the appended claims, any reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like, mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein that is modified by a word of approximation may vary from the stated value by ±10%, unless expressly stated otherwise.

As used herein, the use of "preferred," "preferably," or "more preferred," and the like refers to preferences as they existed at the time of filing of this patent application.

As used herein, a "polymeric construct" refers to virtually any structure that can be fabricated from polymers, either exclusively or partially, that is, where the polymer is an additional component of a construct primarily fabricated of other materials such as, without limitation, metals, ceramics, glasses and the like. Examples of polymeric constructs include, without limitation, toys, structural and non-structural vehicle parts, boats, aeronautic materials, aerospace materials, weapon parts, home appliances, ladders, vanes for wind turbines, pressure vessels, pipes and pipelines, construction materials such as beams, joists, sinks, tubs, shower assemblies, toilets and floors, roofing materials, utensils and the like.

As used herein, a "template" refers to any manner of form onto which or into which a prepolymer of this invention may be applied or deposited. As used herein, the terms "applied" and "deposited" cover any and all manners of disposing the prepolymer formulation of this invention onto or into a mold, through a die, or onto or into a part fabricated of another material including, without limitation, coating, spraying, painting, dipping, ambient pressure injection, pressurized injection, vacuum assisted pressure injection and the like.

Molds that may be used to fabricate a construct using the prepolymer formulation of this invention include, without limitation, casting molds, injection molds of any type, extrusion molds, vacuum molds and compression molds. Mandrels in the shape of a desired construct can be used and the prepolymer of this invention can be applied to the mandrel using any desired manner of prepolymer application such as, without limitation, dipping, spraying or painting. In general, the ability to manipulate the prepolymer formulation of this invention for use in virtually any type of polymeric fabrication technique is one of the primary advantages of this invention.

A key element of the prepolymer formulation of this invention is the dicyclopentadiene (DCPD) that is at least 92%, preferably at present, at least 98% pure. While DCPD is formally a dimeric structure, for the purposes of this invention it will be referred to and treated as a "monomer." DCPD when used as the only monomer in a constituent of a prepolymer formulation provides, naturally, polydicyclopentadiene (pDCPD). pDCPD is a thermosetting polymer that has excellent structural characteristics such as, without limitation, strength, stiffness, impact resistance, impermeability to fluids, inertness to chemicals, corrosion resistance, dielectric properties and hydrophobicity. Constructs made of pDCPD, alone or as a composite comprising a pDCDP matrix combined with a reinforcing material, have an extremely broad operational temperature range that is estimated to extend from about $0.5°$ K. (liquid helium) to about $120°$ C. (approximately $250°$ F.). The extremely low temperature operational range clearly suggests applications in space technology, where temperatures not too far removed from absolute zero may be encountered. Perhaps most notably, DCPD can be cured at temperatures from about $70°$ F. to about $250°$ F., which is an excellent range that augers well for economical fabrication conditions. By comparison, high density polyethylene, a favored polymer for many uses, must be cured at temperatures of $450°$ F. and above, which generally requires expensive specialized fabricating equipment.

The only problem with using DCPD that is that the preferred purity of the monomer—at least 92% pure and most preferable at present at least 98%—is that, at lower temperatures such as $100°$ F. and below, it is a thick liquid approaching a gel-like consistency, which limits its utility for many applications.

The viscosity of DCPD could, of course, be adjusted by the addition of solvents but this engenders problems of its own. In the first place, the use of solvents in any system is currently discouraged for environmental, health and safety reasons. Further, the eventual removal of the solvent can lead to structural defects in the resulting construct such as bubbles, pinholes and the like, which could lead to unsightly end products or, wherein the end product is a critical feature of a device, untimely failure of the device. This invention circumvents the problem by diluting the DCPD with a reactive ethylene monomer, which becomes an integral part of the final copolymer and therefore need not be removed from the final product as would a solvent.

As used herein, a reactive ethylene monomer refers to a small molecule that contains at least one ethylenic, i.e., —C═C—, bond that is capable of reacting with DCPD under the selected conditions for DCPD polymerization and that is a flowable liquid at the desired construct fabrication temperature, which includes both construct formation and curing. Blending of a selected quantities of the reactive ethylene monomer with DCPD results in prepolymer formulations that can have a broad range of viscosities and therefore a broad range of applications.

A "prepolymer formulation" simply refers to the blend of DCPD and the reactive ethylene monomer, along with a curing catalyst and any other excipients such as, without limitation, antioxidants, polymerization rate modifying substances, colorants and the like, prior to its being cured in the course of the selected fabrication process.

A key parameter to be considered when preparing a prepolymer formulation of this invention is, of course, the desired processing temperature. By "processing temperature" is meant the temperature at which the prepolymer formulation will be applied to, extruded through or deposited in or on, a selected template for fabrication of a particular construct or applied or deposited onto an already formed construct to form a layer of cured prepolymer on that construct. A presently preferred processing temperature for fabrication of virtually any type of polymeric construct or coating a layer of the prepolymer formulation on a construct at or near ambient temperature, which renders the fabrication process relatively simple and economical.

As used herein, ambient temperature simply refers to the temperature in the environs where application and curing of the prepolymer is to occur, wherein the environs need not be heated specifically to achieve a suitable application or curing temperature. Generally, ambient temperatures are from about $55°$ F. to about $100°$ F., although the prepolymer formulation of this invention may, of course, be used at temperatures both above and below this range, particularly below this range; for example, under condition as may be found in arctic or Antarctic environments.

Once an operating temperature is established, a desired formulation viscosity at that temperature can be selected. The viscosity will vary depending on, without limitation, the fabrication technique selected, the desired thickness of a layer of the cured prepolymer on another construct if such is the goal of the process and what other substances are to be combined with the formulation during fabrication, such as fibrous or filamentous materials for the fabrication of a composite construct or layer. For example, with regard to the formation of layers of prepolymer on a construct, the thicker the desired layer, the thicker, i.e., the more viscous, the formulation.

With an operating temperature and viscosity in hand, an appropriate catalyst capable of curing the prepolymer to a polymeric final state at the selected curing temperature, which generally is the same as the selected prepolymer deposition temperature, can be selected. Any catalyst suitable for polymerization of ethylenic monomers can be used but it is presently preferred that the polymerization mechanism for the prepolymer formulation of this invention is ring opening metathesis polymerization (ROMP). Useful ROMP catalysts include virtually any standard olefin metathesis catalysts. Typical of such catalysts are, without limitation, Tebbe's reagent, a titanocene-based catalyst, Schrock tungsten, molybdenum and ruthenium catalysts and Grubbs ruthenium catalyst.

The list of possible catalysts is large and the selection of the proper catalyst will depend on the selected deposition timing and curing conditions. Deposition timing should be considered because polymerization may occur too fast for the selected process. For example, without limitation, if a composite layer is to be formed by wrapping a construct with a filamentous material pre-impregnated with the prepolymer formulation of this invention, the process usually requires running the filamentous material through a reservoir of the prepolymer formulation, which naturally will include the polymerization or curing catalyst. If polymerization takes place too rapidly, the reservoir may partially cure and become unusable before the filamentous material can all be impregnated with the prepolymer formulation. The proper selection of a catalyst will aid is avoiding this problem. If desired, a polymerization rate modifying agent may be added to the prepolymer formulation to slow the rate of polymerization. Those skilled in the art will be readily able to select an appropriate catalyst and/or polymerization rate modifier based on the disclosure herein.

Operating temperature, viscosity and catalyst having been selected, another choice to be made in preparing the prepolymer formulation is selection of the reactive ethylene monomer. While numerous reactive ethylene monomers usable with this invention will be immediately recognizable to those skilled in the art based on the disclosure herein, and while any and all such monomers are within the scope of this invention, presently preferred reactive ethylene monomers are norbornenes, in particular, alkylnorbornenes such as, without limitation, 5-alkylnorbornenes. Most preferred at present are 5-hexyl- and 5-decyl-norbornene.

Having established a processing temperature, a viscosity and a catalyst and a reactive ethylene monomer, all that remains to be determined is how much of the reactive ethylene monomer to blend with the DCPD to achieve the desired viscosity at the selected temperature. The amount of reactive ethylene monomer is not particularly limited, the only critical factor being its effect on the physical and chemical properties of the resulting. That is, it is desirable to maintain the physical and chemical properties of pDCPD, which would generally be the reason for using the prepolymer of this invention in the first place. It is presently preferred that the amount of reactive ethylene monomer be generally in the range of 0.1 to 10 weight percent (wt %) based on total monomer content of the prepolymer composition. In general, "total monomer content" refers to the total weight of monomers in the prepolymer formulation and would generally simply be the weight of the reactive ethylene monomer plus the weight of the DCPD although, if desired, more than one reactive ethylene monomer may be used in which case the total monomer content would include those additional monomers also.

It is understood that the order of parameter and component selection above is exemplary only and is not intended nor should it be construed as limiting the scope of this invention in any manner. For example, if desired, a specific reactive ethylene monomer may be the first parameter considered, etc.

As a non-limiting example of a prepolymer formulation for use at a particular operating temperature, DCPD can be blended with about 4 wt % to about 6 wt % of 5-hexylnorobornene or 5-decylnorbornene and about 0.003 to 0.0003 mol % of catMETium RF2 catalyst (Evonik Industries, Essen Germany) based on the total moles of monomer present to give a prepolymer formulation that is flowable at 70° F. to 80° F. Under these conditions, the prepolymer formulation will, for instance, readily afford a layer of material on a construct that is about 0.0125 inches thick. Of course, those skilled in the art will be able to vary the parameters of the prepolymer formulation to prepare a prepolymer formulation with virtually any desired viscosity at virtually any temperature for a broad variety of uses.

As mentioned above, if desired, a polymerization rate modifier may be added to the prepolymer composition. Such rate modifiers include, without limitation, triphenylphosphate.

In addition, if desired, an antioxidant may be included in the prepolymer composition. Useful antioxidants include, without limitation, hindered phenols, secondary aromatic amines, phosphites, phosphonates, dithiophosphonates and sulfur-containing organic compounds.

Other excipients that may occur to those skilled in the art as being required in the final construct may also be added to the prepolymer formulation. These may include, without limitation, colorants, odorants, antiseptics, UV absorbers and the like. Prepolymer formulations containing any additive that does not detrimentally affect the properties of the copolymer are within the scope of this invention.

As mentioned previously, the prepolymer formulation of this invention is eminently suitable for the preparation of composites in which the cured prepolymer formulation comprises the polymeric matrix. Composites comprise fibrous or filamentous materials impregnated with and embedded in a matrix polymer, i.e., the polymer resulting from the curing of the prepolymer formulation of this invention. With regard to fibrous or filamentous materials, any known material with the requisite strength properties or any such material that may become known in the future to have the requisite characteristics for a particular use may be used as the fibrous or filamentous component of the polymeric composite. Such fibrous or filamentous materials presently include, without limitation, natural (silk, hemp, flax, etc.), metal, ceramic, basalt and synthetic polymer fibers and filaments. Currently preferred are fibers of filaments made of glass, e.g. fiberglass, carbon, aramid, sometimes referred to by the trade name Kevlar® and ultra-high molecular weight polyethylene, such as those sold under the tradenames Spectra® (Honeywell Corporation) and Dyneeva® (Royal DSM N.V.). Combinations of these fibrous or filamentous materials may also be used.

A particular advantage of this invention and its ability to substantially vary the viscosity of the prepolymer composition is that a very high fibrous or filamentous material volume percent (vol %) composite may be formed. That is, a composite comprising from about 10 vol % to about 90 vol % fibrous or filamentous material can be created by adjusting the viscosity of the prepolymer composition to assure complete impregnation of the filamentous material with the prepolymer and effective embedding of the filamentous material in the prepolymer composition.

The filamentous material may be embedded in the matrix polymer in two ways, pre-impregnation and dry winding. In the former, the filamentous material is drawn through a reservoir of the matrix polymer and then wound around a construct, which may comprise the prepolymer or another material entirely. In the latter instance, the filamentous material is dry-wound around the construct and then a layer of the matrix polymer is applied over the fully wound construct. The equipment and techniques for each procedure are well-known in the art and need not be described in detail herein.

What is claimed:

1. A method of fabricating a polymeric composite reinforced construct, comprising:
    depositing onto the construct a prepolymer composition comprising dicyclopentadiene that is at least 92% pure, a reactive ethylene monomer and a ruthenium curing catalyst, wherein:
        the reactive ethylene monomer comprises a weight percentage of the total monomer content such that the prepolymer composition has a desired viscosity at ambient temperature;
    the prepolymer composition is deposited onto the template at ambient temperature;
        the prepolymer composition further comprises a reinforcing material embedded therein, wherein the reinforcing material is embedded in the prepolymer composition prior to deposition of the composition onto the construct or the prepolymer composition is deposited onto the construct after the reinforcing material has been deposited thereon; and
    curing the deposited prepolymer composition at ambient temperature to form the polymeric composite reinforced construct.

2. The method of claim 1, wherein the reactive ethylene monomer comprises from about 1 wt % to about 10 wt % of the total monomer content.

3. The method of claim 2, wherein the reactive ethylene monomer comprises from about 4 wt % to about 6 wt % of the total monomer content.

4. The method of claim 1, wherein the reactive ethylene monomer comprises unsubstituted or substituted norbornene.

5. The method of claim 4, wherein the substituted norbornene is a 5-alkyl norbornene.

6. The method of claim 5, wherein the 5-alkyl moiety is selected from the group consisting of 1C-12C straight or branched chain alkyls.

7. The method of claim 6, wherein the straight chain alkyl is selected from hexyl or decyl.

8. The method of claim 1, wherein the polymeric composite reinforcing material comprises a fibrous, filamentous or any combination thereof, reinforcing material.

9. The method of claim 8, wherein the fibrous or filamentous reinforcing material is selected from the group consisting of glass, carbon, aramid and ultra-high molecular weight polyethylene.

10. The method of claim 8, wherein the reinforcing material comprises 10 vol % to 90 vol % of the prepolymer composition.

11. A construct fabricated using the method of claim 1.

12. The construct of claim 11, wherein the construct is a pressure vessel.

* * * * *